United States Patent [19]

Nagano et al.

[11] 4,000,264
[45] Dec. 28, 1976

[54] METHOD OF RECOVERING SODIUM HYDROXIDE FROM SULFUR FREE PULPING OR BLEACHING WASTE LIQUOR BY MIXING FERRIC OXIDE WITH CONDENSED WASTE LIQUOR PRIOR TO BURNING

[75] Inventors: Tadashi Nagano, Tokyo; Saisei Miyao; Noriyoshi Niimi, both of Kure, all of Japan

[73] Assignee: Toyo Pulp Co., Ltd., Japan

[22] Filed: Oct. 1, 1974

[21] Appl. No.: 511,467

[30] Foreign Application Priority Data

Feb. 23, 1974 Japan .............. 49-21631

[52] U.S. Cl. .............. 423/183; 423/207; 162/30 R
[51] Int. Cl.$^2$ .............. C01D 1/04; D21C 11/04
[58] Field of Search ............ 162/30; 423/140, 182, 423/183, 641, 207

[56] References Cited

UNITED STATES PATENTS

| 274,619 | 3/1883 | Lowig | 423/641 |
|---|---|---|---|
| 1,699,808 | 1/1929 | Rinman | 423/182 |
| 1,743,080 | 1/1930 | Bradley et al. | 423/183 |
| 1,852,264 | 10/1929 | Rinman | 162/30 |
| 1,906,102 | 4/1933 | Rinman | 162/30 |
| 3,043,655 | 7/1962 | Green et al. | 162/30 |
| 3,366,535 | 1/1968 | Cann | 423/207 |

OTHER PUBLICATIONS

Casey J. P "Pulp and Paper" vol. I Spc. Ed. Interscience Pub. NY, NY 1960 pp. 267–271.

Primary Examiner—S. Leon Bashore
Assistant Examiner—Peter F. Kratz
Attorney, Agent, or Firm—Wenderoth, Lind & Ponack

[57] ABSTRACT

This invention relates to a new and improved recovery method of chemicals from waste liquor of pulping or bleaching. More particularly, this invention relates to a method for direct recovery of sodium hydroxide from waste liquor of pulping or bleaching which is substantially free from sulfur compounds. Ferric oxide is admixed with concentrated waste liquor and thereafter the admixture is burned to form a smelt. By submerging the smelt in hot water a solution of sodium hydroxide and a ferric oxide precipitate are obtained. The precipitated ferric oxide can be reused in the mixing step.

4 Claims, No Drawings

METHOD OF RECOVERING SODIUM HYDROXIDE FROM SULFUR FREE PULPING OR BLEACHING WASTE LIQUOR BY MIXING FERRIC OXIDE WITH CONDENSED WASTE LIQUOR PRIOR TO BURNING

It is well known that sodium hydroxide is widely used in a pulp and paper industry as a cooking and bleaching chemical. The only method now commercially employed for recovery of sodium hydroxide from waste liquor of pulping or bleaching is caustification by using lime, which is commonly applied in a conventional kraft recovery system.

In the case of the regeneration of sodium hydroxide by using lime, there is generally employed a smelted product, which is produced by burning waste liquor in a recovery boiler, which smelted product is submerged into water and is then subjected to caustification where sodium carbonate reacts with calcium hydroxide to produce sodium hydroxide and calcium carbonate. This process has some advantages in that lime is an easily and cheaply available material. Furthermore, in case of kraft pulping recovery process, sodium sulfide, which is produced from salt cake, does not react with calcium hydroxide, so a mixture of sodium hydroxide and sulfide solution which is generally known as white liquor is easily obtained.

However, in the causticizing process by using lime mentioned above, it is necessary, in order to reuse calcium carbonate which is produced and precipitated during caustification, to regenerate calcium hydroxide from the calcium carbonate by using a device such as a rotary kiln, fluid-bed kiln or the like. Moreover, some generation of lime dregs, which cannot be reused, is unavoidable, and this creates a disposal problem.

In addition to the disadvantages described above, further defects exist in the prior art process. Firstly, the concentration of sodium hydroxide solution obtained by the process is limited to less than about 15%, and this forces one to make the ratio of cooking liquor to wood in the cooking step high. It is therefore easily presumed that the heat economy will be adversely affected. Secondly, because the efficiency of caustification by the prior art process is about 85% at most, inactive sodium salts which have never been converted to sodium hydroxide are circulated throughout whole pulping process which contaminates the process. This increases the chance for chemical loss and increases the load of the recovery boiler.

Therefore, it is an object of the present invention to provide a new and improved method of recovering sodium hydroxide from waste liquor discharged from pulping and/or bleaching steps wherein defects of the prior art process hereinbefore described can be overcome.

It is another object of the present invention to provide a method of recovering sodium hydroxide from waste liquor wherein sodium hydroxide can be recovered directly and simply by eliminating the use of lime and the process for regeneration of lime.

It is a further object of the present invention to provide a method of recovering sodium hydroxide from waste liquor wherein a solution having a relatively high concentration of sodium hydroxide can be directly and simply recovered at a high efficiency of caustification.

According to the present invention, there is provided a method for recovering sodium hydroxide from waste liquor which is discharged from pulping and/or bleaching of cellulosic materials and is substantially free from sulfur. This comprises condensing the waste liquor, mixing ferric oxide into the condensed waste liquor, burning the mixture to produce a smelted product, submerging the smelted product in hot water to thereby directly form sodium hydroxide solution and precipitate of ferric oxide, and reusing the thus precipitated ferric oxide in the mixing step.

As stated above, the present invention provides a simplified process to obtain sodium hydroxide solution directly by burning soda pulping waste liquor coexistent with ferric oxide. It is probably considered that this ferric oxide reacts with sodium carbonate and sodium oxide which are derived from organic sodium salts in the waste liquor, to form sodium ferrate ($Na_2Fe_2O_4$) in the smelting zone of a recovery boiler in accordance with the following equations (1) and (2). Sodium ferrate thus formed is then submerged and subjected to extraction with hot water. By this submersion, sodium hydroxide is recovered as an extract solution and ferric oxide is generated as a residual precipitate in accordance with the following equation (3).

$$Na_2CO_3 + Fe_2O_3 = Na_2Fe_2O_4 + CO_2 \qquad (1)$$

$$Na_2O + Fe_2O_3 = Na_2Fe_2O_4 \qquad (2)$$

$$Na_2Fe_2O_4 + H_2O = 2NaOH + Fe_2O_3 \qquad (3)$$

The regenerated ferric oxide precipitate is reused and mixed again into the waste liquor without any further treatment.

In practice of the present invention, the condensing and burning steps of the pulping waste liquor may be carried out under the similar conditions to that employed in the conventional chemical recovery process. Therefore, conventional equipment such as a kraft recovery boiler, fluid bed kiln, and other types of smelter furnaces which have been employed in the recovery of pulping chemicals may be adapted to the present invention.

In order to keep the efficiency of caustification at more than about 80%, ferric oxide is required to be added into the condensed waste liquor in an at least an equimolar amount to sodium, as $Na_2O$, contained in the waste liquor. However, if it is desired to obtain a mixture solution of sodium hydroxide and sodium carbonate, this can be accomplished by decreasing the addition of ferric oxide into the condensed waste liquor. Because the efficiency of caustification is strongly related to the mol ratio of ferric oxide to be added to sodium (as $Na_2O$), contained in the waste liquor as sodium compounds, the efficiency of caustification may be controlled by controlling the amount of ferric oxide to be added. The mixture of ferric oxide and the condensed waste liquor is then burnt preferably at a temperature of about 700° to about 900° C. The extraction temperature, namely the temperature of hot water into which the smelt is submerged, is maintained preferably at about 50° to about 100° C.

Ferric oxide used in the present invention is preferably powdered or granular.

Since sodium hydroxide is directly extracted from the smelt by the present invention, the sodium hydroxide solution having high concentration of more than about 15% can be easily obtained. This favorably affects the water balance of pulping process and accordingly, superior heat economy can be expected.

In addition, an efficiency of caustification of more than about 90% can be easily attained by the present invention. Therefore inactive sodium salts, which have never been converted to sodium hydroxide and are circulated in the pulping process, are greatly reduced.

As is apparent from the description hereinbefore, the sodium hydroxide solution is, according to the invention, directly obtained without complex process of caustification with lime, so that the process for regeneration of lime as well as the disposal of lime dregs can be eliminated.

The present invention can primarily be applied to the chemical recovery from the waste liquor substantially free from sulfur in a process such as soda-pulping process or soda-oxygen delignification process, and cannot be applied in the case where the pulping waste liquor contains sulfur as in the kraft or sulfite processes.

The following examples are given by way of illustration only and are not intended as limitative of this invention since many apparent variations of the invention are possible without departing from its spirit or scope.

EXAMPLE 1

Waste liquor discharged from soda pulping process of Hemlock was concentrated by vacuum evaporator up to solid content of 40%. Ferric oxide powder was mixed into the thus obtained concentrated waste liquor in an amount two times the equivalent moles of sodium contained in the waste liquor. The mixture of ferric oxide and the waste liquor was subjected to burning in a platinum crucible at a temperature of about 800° C for 30, 60, and 180 minutes to form three smelted products. These smelted products were respectively submerged in hot water and the temperature of the hot water was maintained at about 90° C for 20 minutes with continuous stirring, thus three extract solutions and precipitates of ferric oxide were produced. The compositions of these extract solutions are shown in the following table.

| Burning time | NaOH, g/l (as $Na_2O$) | $Na_2CO_3$, g/l (as $Na_2O$) | Efficiency of Caustification, % |
|---|---|---|---|
| 30 | 128.5 | 33.8 | 79.1 |
| 60 | 136.8 | 23.5 | 85.3 |
| 180 | 150.1 | 9.6 | 94.0 |

The precipitated and regenerated ferric oxide was reused to mix into another concentrated waste liquor, and thus the reuse or circulation of the regenerated ferric oxide was repeated three times using the same procedure and under the same conditions as described above. As a result, efficiency of caustification each time was 95.6%, 93.9%, 98.2% respectively, when burning each time was conducted for 180 minutes.

EXAMPLE 2

According to the same procedure as indicated in Example 1 except that the mol ratio of ferric oxide to sodium (as $Na_2O$) is altered and burning time of 180 minutes is employed. The smelted products were obtained and submerged in hot water.

The compositions of these extract solutions are shown in the following table.

| Initial mol ratio of ferric oxide to sodium compounds as $Na_2O$ | NaOH, g/l (as $Na_2O$) | $Na_2CO_3$, g/l (as $Na_2O$) | Efficiency of Caustification, % |
|---|---|---|---|
| 1 : 2 | 64.2 | 94.6 | 40.4 |
| 1 : 3 | 48.1 | 109.9 | 30.4 |

What is claimed is:
1. A method of recovering sodium hydroxide from waste liquor which is discharged from pulping and/or bleaching steps of cellulosic materials and is substantially free from sulfur, which comprises
    a. condensing the waste liquor,
    b. caustifying said waste liquor, by the steps of
        i. mixing ferric oxide into the condensed waste liquor, the amount of ferric oxide admixed in said condensed waste liquor controlling the efficiency of caustification,
        ii. burning the mixture to produce a smelted product,
        iii. submerging the smelted product in hot water to thereby directly form sodium hydroxide solution and a precipitate of ferric oxide, and
    c. reusing the thus precipitated ferric oxide in said mixing step.
2. The method according to claim 1, wherein the burning step is carried out at a temperature of about 700° to about 900° C.
3. The method according to claim 1, wherein the temperature of the hot water in the submerging step is maintained at about 50° to about 100° C.
4. The method according to claim 1, wherein the amount of ferric oxide admixed in the condensed waste liquor is at least equimolar to sodium, as $Na_2O$, contained in the condensed waste liquor, in order to obtain an efficiency of caustification of more than about 80%.

* * * * *